UNITED STATES PATENT OFFICE.

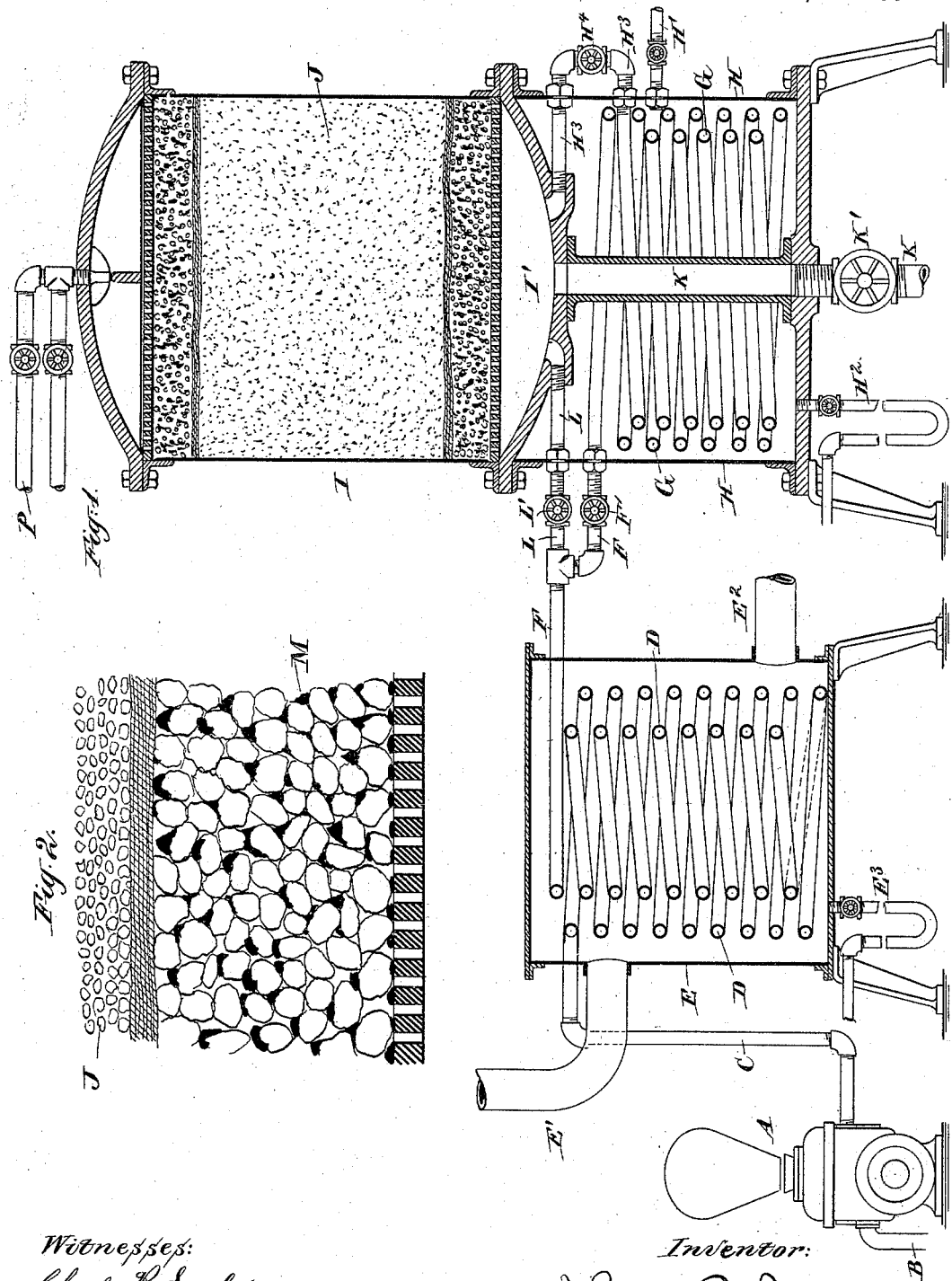

HERMON B. GATES, OF EDGEWATER, NEW JERSEY.

WATER HEATER AND PURIFIER.

SPECIFICATION forming part of Letters Patent No. 535,243, dated March 5, 1895.

Application filed November 14, 1894. Serial No. 528,717. (No model.)

*To all whom it may concern:*

Be it known that I, HERMON B. GATES, a citizen of the United States, residing at Edgewater, in the county of Bergen and State of New Jersey, have invented a certain new and useful Improvement in and Relating to Water Heaters and Purifiers, of which the following is a specification.

My invention is intended more particularly for preparing the water for steam-boilers, and I will describe it as thus applied. The apparatus occupies but a moderate space, and involves but little expense for construction, and but little labor or skill to keep it in condition.

It has long been known that earthy matter which is held in solution in water at ordinary temperatures will be precipitated when the water is heated, but, as heretofore conducted, the operation has resulted in depositing the earthy material on the surfaces of the boiler, or on some other surfaces presented to receive such deposit. I have discovered that by inducing proper conditions, such impurities may be precipitated without adhering to anything and may remain in a fine granular condition so that the charcoal may be restored again nearly to its original vigor by washing and at proper intervals re-burning, and the operation may be continued for an indefinite period without the charcoal being deteriorated by any earthy matter.

It is important in treating water for boilers that a certain amount of impurity is allowed to remain, as in my opinion and experience, absolutely pure water induces difficulties, one of the most serious of which is a corrosion or eating into the interior of the boiler, which rapidly proceeds to a destructive extent at points.

My invention may receive water with any ordinary or extraordinary impurities and will reduce it to a moderately pure condition, leaving just sufficient foreign matter to avoid difficulties.

In my partial purification of water, I use a capacious filter containing animal charcoal reduced to a just sufficient degree of fineness, about the size of wheat. The water before entering the filter is forced by a feed-pump with a pressure sufficiently in excess of that in the boiler to overcome the slight resistance experienced in passing successively through the heater and the filter.

In cases where for any reason a higher degree of purity is desired, I raise the impure water to a higher temperature before filtering it. To accomplish this in connection with non-condensing, or what are commonly termed high pressure steam engines, I employ two heaters and pass the water through them successively. The first heated by the exhaust steam raises the temperature to about 212° Fahrenheit, and the second heated by live steam imparts to the water the additional temperature desired. This attains the end with only a small consumption of live steam.

The accompanying drawings form a part of this specification and represent what I consider the best means of carrying out the invention.

Figure 1 is a central vertical section through the entire apparatus. Fig. 2 is a corresponding section of a portion on a larger scale.

Similar letters of reference indicate corresponding parts in both the figures.

Referring to the drawings and to the letters of reference thereon, A is the feed-pump, operated in any ordinary or suitable manner, and B a pipe bringing water which may contain earthy elements, as lime and magnesia, or organic matter, as nitrates, or both.

C is a delivery pipe, conducting the water under the high pressure generated in the pump into a coil D which is inclosed in a case E, which latter receives steam through a pipe E', and allows its uncondensed portion to escape through a pipe $E^2$.

The steam should be at or near the ordinary atmospheric pressure. It may be the whole or a portion of the exhaust steam from a non-condensing engine. The exposure of the coil D to this steam must be sufficient to raise the temperature of the inclosed water to or very nearly to that of such steam. The water of condensation may be discharged through a pipe $E^3$, trapped as shown. It is well to make the trap very deep to avoid blowing through under any conditions. The water thus heated moves through a pipe F into a coil G in a second casing H, which latter receives steam from the boiler through a pipe H', and discharges such high-pressure steam and the water of condensation through a pipe H², the valve in the discharge pipe H² being open so little as to only discharge the water with a very little steam. It is important that the pressure in the casing H be kept nearly up to that in the boiler. From the second heater G, H, the now highly heated water is allowed to flow through a pipe H³ into the bottom I' of a capacious filter I, which is filled with bone black, J—animal charcoal. It is important that this material be sufficiently fine to be effective, and not so fine as to seriously obstruct the passage of the water. The grains may be ordinary broken fragments, say an eighth of an inch in diameter.

The filter is formed with a strainer of perforated metal and other material, as gravel and coarse fabric, at the bottom and top. My experiments indicate that the heating of the water materially modifies the effect of the filter. The charcoal absorbs the organic impurities and becomes inert, and requires re-burning at intervals, as has been long practiced in the same and other arts. My experiments indicate that the earthy impurities are separated from the water without becoming attached to the charcoal. I find quantities of such impurities in the form of fine material loosely inclosed in the filter and distributed according to the currents of the water through the irregular spaces. This is removed by simply washing.

P is the pipe which connects the filter with the boiler.

H⁴ is a cock in the pipe H³, which can be tighly closed when required.

K is a pipe leading out from the bottom of the filter, controlled by a cock K'.

At short intervals in the working of my apparatus I stop the pump, close the cock H⁴ and open the cock K' for a brief period and then rapidly restore the parts to their previous positions. The condition during the brief interval induces a back flow of the water from the boiler through the filtering material J and removes a large portion of the loosely deposited earthy matter M. At longer intervals the filter should be opened, and the entire contents removed, and a fresh stock supplied.

L is a by-pass pipe, controlled by a valve L', and which by opening the valve may put the bottom of the filter into direct communication with the coil D. When this cock or valve L' is opened and the cock or valve F' is closed, the water flows from the first heater D, E, directly to the bottom of the filter, and up through the filtering material without being subjected to the second heating. It is preferable to work in this manner when feeding boilers under ordinary circumstances.

It is important that the water be heated, but in purifying water for boilers it is necessary that it be heated to a less degree than that which it shall attain in the boiler so that there shall remain a slight tendency in the water to deposit earthy material in the boiler, as otherwise there is danger of corroding the boiler.

Obviously if both cocks are left open the water will flow mainly through the more direct passage afforded by the valve L, and only a small proportion of the water will flow through the second heating pipe G and become more intensely heated. If under these conditions the cock L' is partially closed the water can flow in varying proportions through the second heater G. The apparatus gives capacity to flow all the water through both heaters and present it to the filter at a temperature very nearly up to that in the boiler or at the much lower temperature corresponding nearly to the exhaust steam or at any degree between these temperatures which may be found preferable.

While the forms and proportions shown are those which I prefer, modifications may be made which will not depart from the principle or sacrifice the advantages of the invention, and such are intended to be included in the claims.

I claim as my invention—

1. The apparatus described, comprising the pump A, induction pipe B, delivery pipe C, surface heater D, E, pipes F, L, and G, having controlling cocks F', L', filter I, containing charcoal, and pipe P connecting the filter with the boiler, all combined and arranged for joint operation substantially as herein specified.

2. The apparatus described, comprising the pump A, induction pipe B, delivery pipe C, surface heater D, E, pipes F, L and G, having controlling cocks F', L', filter I containing animal charcoal, and pipe P connecting the filter with the boiler, and cleaning pipe K with its cock K', all combined and arranged for joint operation substantially as herein specified.

In testimony that I claim the invention above set forth I affix my signature in presence of two witnesses.

HERMON B. GATES.

Witnesses:
 A. L. BOYLE,
 M. F. BOYLE.